(12) United States Patent
Bogic

(10) Patent No.: US 9,505,589 B1
(45) Date of Patent: Nov. 29, 2016

(54) PIPELINE CRADLE

(71) Applicant: CCI Rentals Inc., Cochrane (CA)

(72) Inventor: Branislav Bogic, Calgary (CA)

(73) Assignee: CC Land Holdings Inc., Cochrane (CA)

( * ) Notice: Subject to any disclaimer, the term of this patent is extended or adjusted under 35 U.S.C. 154(b) by 0 days.

(21) Appl. No.: 14/723,190

(22) Filed: May 27, 2015

(51) Int. Cl.
*B66C 1/00* (2006.01)
*B66C 1/22* (2006.01)

(52) U.S. Cl.
CPC ...................................... *B66C 1/22* (2013.01)

(58) Field of Classification Search
CPC ........... B66C 1/22; B66C 1/108; B66C 1/10; B66C 1/62; B66C 1/16; E21B 19/20; Y10S 414/123
USPC ........ 294/67.1, 67.4, 81.2; 414/745.6, 745.4, 414/745.5, 22.51; 405/184.4
See application file for complete search history.

(56) References Cited

U.S. PATENT DOCUMENTS

| | | | |
|---|---|---|---|
| 2,559,703 A | 7/1951 | Bergman | |
| 3,343,861 A * | 9/1967 | Sinicki | B66C 1/62 294/103.1 |
| 3,502,363 A | 3/1970 | Ramsey | |
| 5,887,923 A * | 3/1999 | Gardner, III | B65G 49/061 294/74 |
| 2009/0297317 A1* | 12/2009 | Kline | B66C 1/427 414/745.4 |

OTHER PUBLICATIONS

"Full Package of Technologies, Equipment and Materials for Constructions, Repair and Rehabilitation of Pipelines and Infrastructure," Argus Limited, <http://www.arguslimited.com> [retrieved Jan. 7, 2015], 2-page brochure.
"Rubber Tired Cradles," Proline Global, <http://www.proline-global.com> [retrieved Jan. 7, 2015], 1-page brochure.

* cited by examiner

*Primary Examiner* — Gabriela Puig
(74) *Attorney, Agent, or Firm* — Christensen O'Connor Johnson Kindness PLLC

(57) ABSTRACT

A cradle for lifting pipelines has a base with wheels supporting the pipeline. Lifting arms connect the base to a spreader bar for lifting the base. The lifting arms can have pivotable connections to the base and to the spreader bar. The connection of the lifting arms to the spreader bar can have an adjustable position to accommodate different pipeline sizes. The lifting arms can also have side wheels with adjustable position.

10 Claims, 15 Drawing Sheets

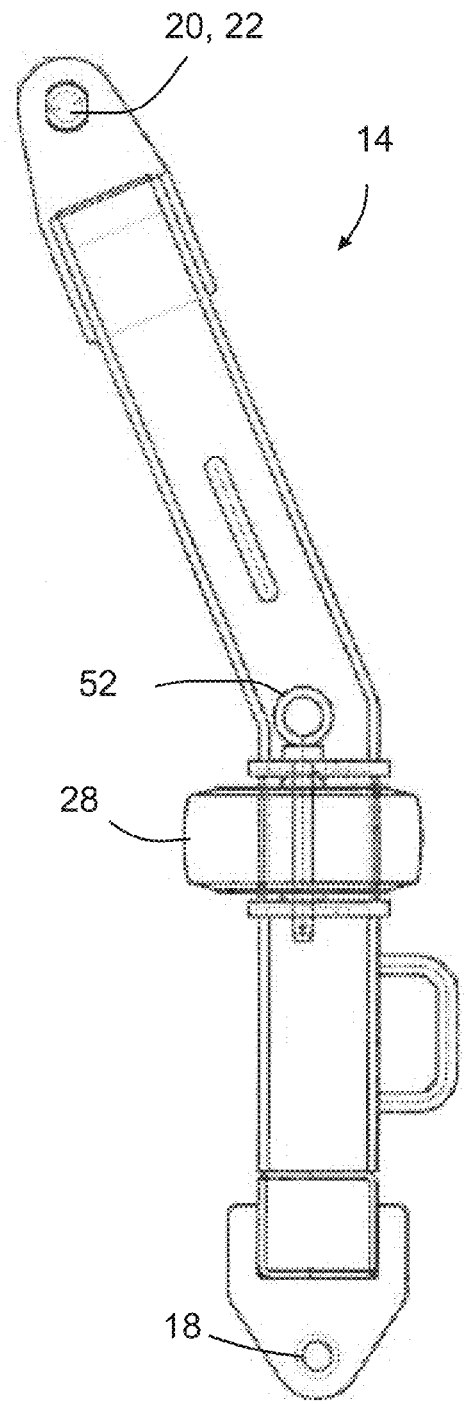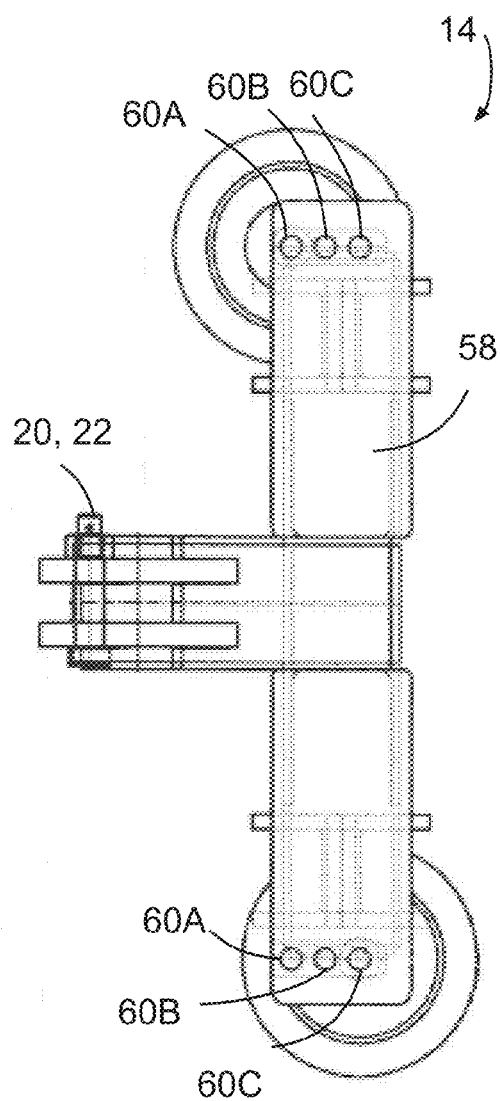
Fig. 7B
Fig. 7C

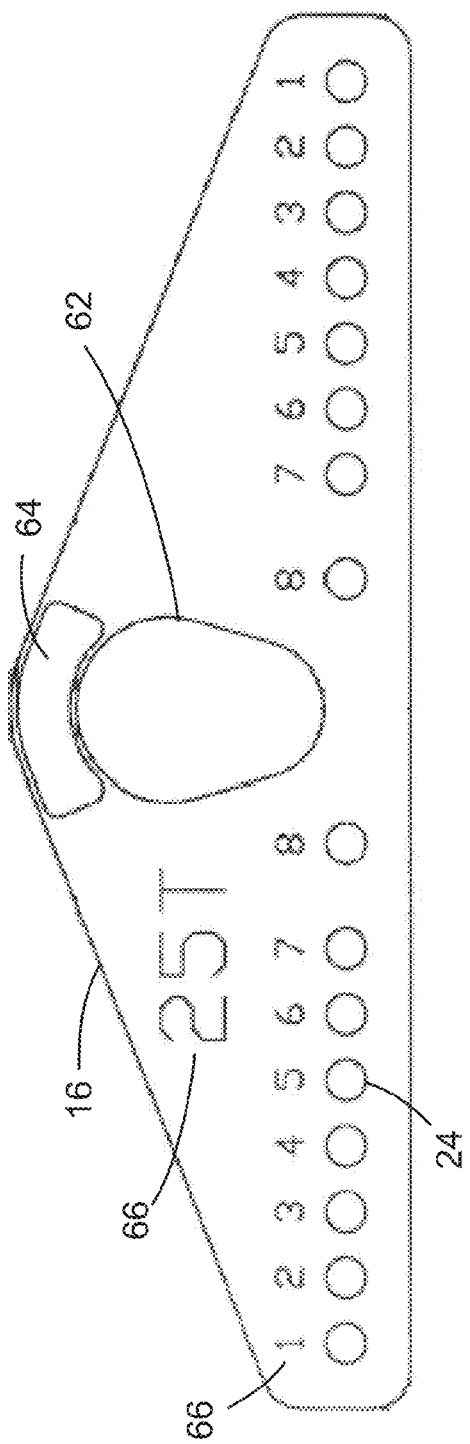
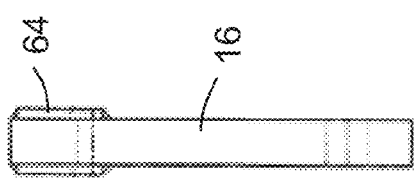
Fig. 8A
Fig. 8B

PIPELINE CRADLE

TECHNICAL FIELD

Cradles for lifting pipelines.

BACKGROUND

Previous cradles for lifting pipelines include: a cradle having a base with wheels with treaded pneumatic tires supporting the pipeline, but with the wheels also touching the ground when the base is on the ground, the base being suspended from a spreader bar using flexible cables, the base also having guide rollers; and a cradle having polyurethane rollers to support a pipeline, the polyurethane rollers being suspended directly from a spreader bar by flexible cables or by rigid lifting arms hinged at both ends.

SUMMARY

There is provided a cradle for lifting a pipeline, the cradle having a base, wheels mounted in the base, the wheels configured to support the pipeline when the base is positioned under the pipeline, a spreader bar configured to be positioned above the pipe; and rigid connector arms for connecting the spreader bar to the base to support the base, the rigid connector arms each having a pivotable connection for connecting to one of the spreader bar and the base and a connection with an adjustable position for connecting to the other of the spreader bar and the base.

In various embodiments, there may be included any one or more of the following features: the connection with an adjustable position may also be pivotable; there may be side wheels mounted on the rigid connector arms to prevent contact of the rigid connector arms with the pipe; the side wheels may be mounted on the rigid connector arms with an adjustable position; the one of the spreader bar and the base may be the base and the other of the spreader bar and the base may be the spreader bar; the wheels may be positioned within the base so that the wheels do not touch the ground when the base is placed on the ground; the wheels mounted in the base may have treadless tires constructed to distribute weight evenly across the tires; and the wheels mounted in the base have treadless tires.

In a further embodiment there is provided a cradle for lifting a pipeline, the cradle having a base, wheels mounted in the base, the wheels configured to support the pipeline when the base is positioned under the pipeline, the wheels being positioned within the base so that the wheels do not touch the ground when the base is placed on the ground, and a spreader bar configured to be positioned above the pipe and to connect to the base to support the base.

In a further embodiment there is provided a cradle for lifting a pipeline, the cradle having a base, wheels mounted in the base, the wheels having treadless tires constructed to distribute weight evenly across the tires, the wheels configured to support the pipeline when the base is positioned under the pipeline, and a lifting structure configured to attach to the base to support the base.

In a further embodiment there is provided a cradle for lifting a pipeline, the cradle having a base, wheels mounted in the base, the wheels having treadless tires, the wheels configured to support the pipeline when the base is positioned under the pipeline, and a lifting structure configured to attach to the base to support the base.

In a further embodiment there is provided a cradle for lifting a pipeline, the cradle having a base, wheels mounted in the base, the wheels configured to support the pipeline when the base is positioned under the pipeline, a spreader bar configured to be positioned above the pipe, and rigid connector arms for connecting the spreader bar to the base to support the base, the rigid connector arms each supporting side wheels to prevent contact of the rigid connector arms with the pipe.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIGS. 7A-7C show a side view, end view and top view respectively of a lifting arm of the embodiment of FIG. 1;

FIGS. 8A-8B show an end view and side view respectively of a spreader bar of the embodiment of FIG. 1;

DETAILED DESCRIPTION

Figure 1:
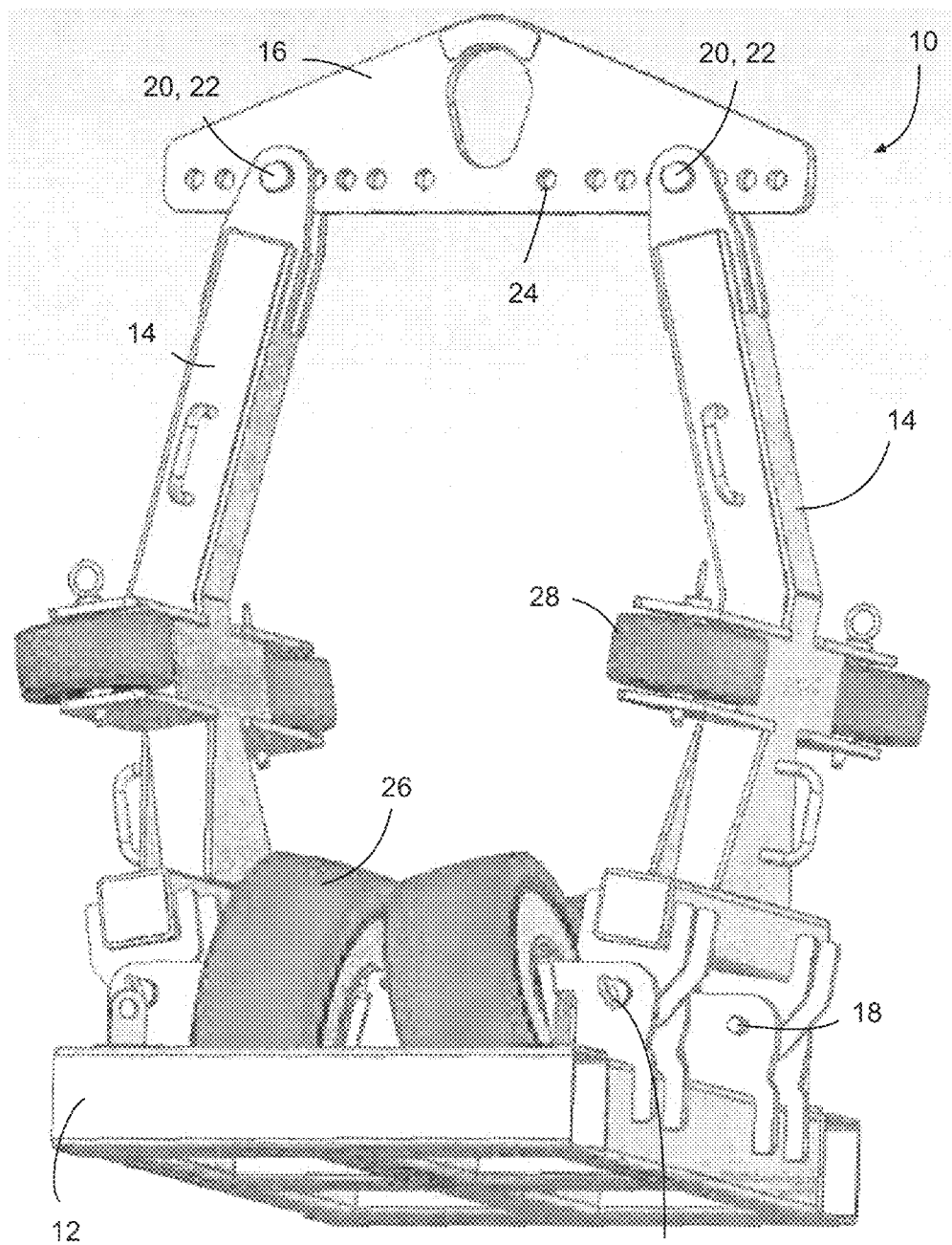
FIG. 1 shows a perspective view of an embodiment of the invention.

Referring to FIG. 1, an embodiment pipeline cradle generally indicated by reference numeral 10 comprises a base 12, lifting arms 14 and spreader bar 16. In the embodiment shown, the lifting arms 14 are connected to base frame 12 by hinged connections 18 and to the spreader bar 16 by movable connections 20 which may also be hinged. Here, the movable connections 20 each comprise a bolt 22 that can extend through one of multiple holes 24 in the spreader bar to connect the respective lifting arm 14 to the spreader bar. Base wheels 26 are mounted in the base 12 to support a pipe (not shown in FIG. 1, but indicated by reference numeral 30 in FIG. 2). Side wheels 28 are supported by lifting arms 14. The base wheels in the embodiment shown are elevated so as not to contact the ground when the base is on the ground. This allows the cradle to be used as a roller permitting the pipe to move on the wheels while the cradle stays fixed on the ground.

Figure 2:
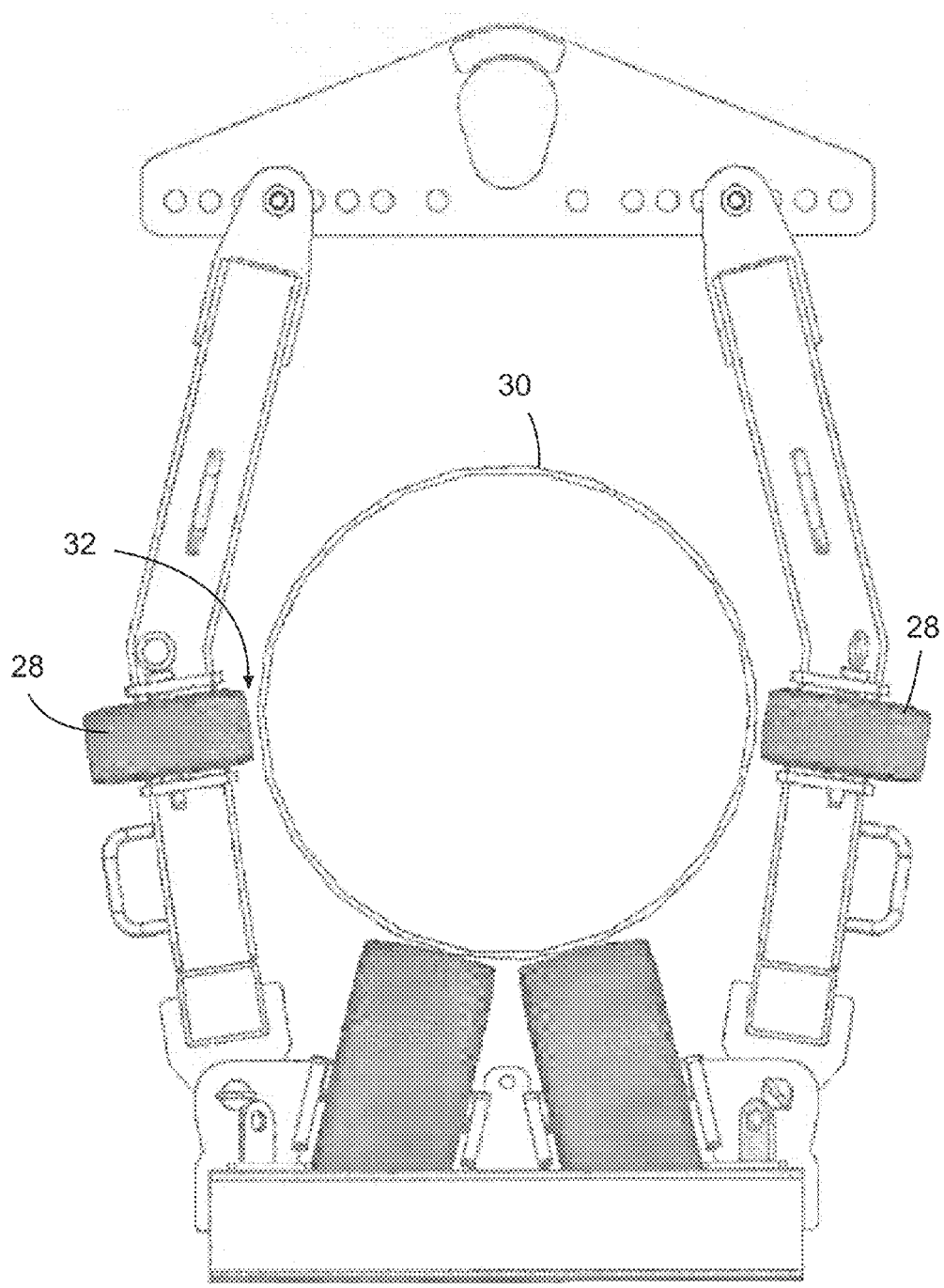
FIG. 2 shows an end view of the embodiment of FIG. 1 with a pipe positioned to be carried.

Referring to FIG. 2, a pipe 30 is shown supported by base wheels 26. Side wheels 28 are positioned with a small clearance 32 from the pipe during normal positioning but in the event of e.g. tilt can contact the pipe to stabilize positioning and prevent the pipe from coming into contact with the lifting arms. In the embodiment shown the hinged connections at the top and bottom of the lifting arms allow sideways motion of the base and spreader bar relative to each other causing tilt of the lifting arms. In this event, the side wheels on one of the arms can contact the pipe preventing further sideways motion.

Figure 3:
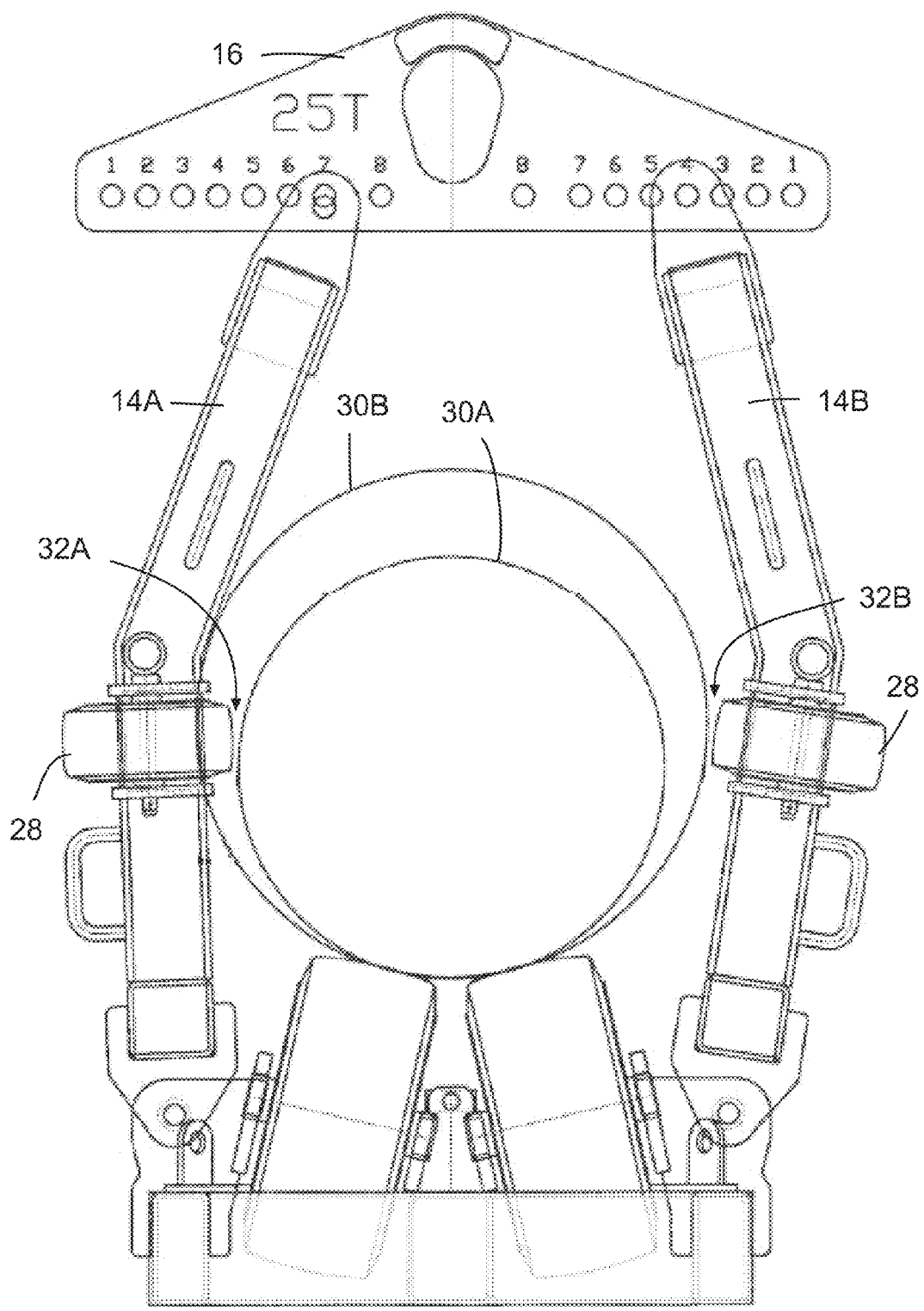
FIG. 3 shows an end view of the embodiment of FIG. 1 showing 30" and 36" pipes.

FIG. 3 shows different sized pipes 30A (of 30 inch diameter) and 30B (of 36 inch diameter). In normal use, only one pipe would be present. Multiple pipes are shown at once in FIG. 3 and FIG. 4 only to make it clear how the elements of the pipe cradle can move to accommodate different pipe sizes. In the figure, left lifting arm 14A is connected to a hole in the spreader bar 16 near the center of the spreader bar to accommodate the smaller pipe 30A, and right lifting arm 14B is connected to hole in the spreader bar 16 further from the center of the spreader bar to accommodate the larger pipe 30B. In normal use, typically both lifting arms would be arranged symmetrically to accommodate a single pipe. Clearances 32A and 32B between side wheels 28 and pipes 30A and 30B respectively are both 0.5 inches in this figure.

Figure 4:
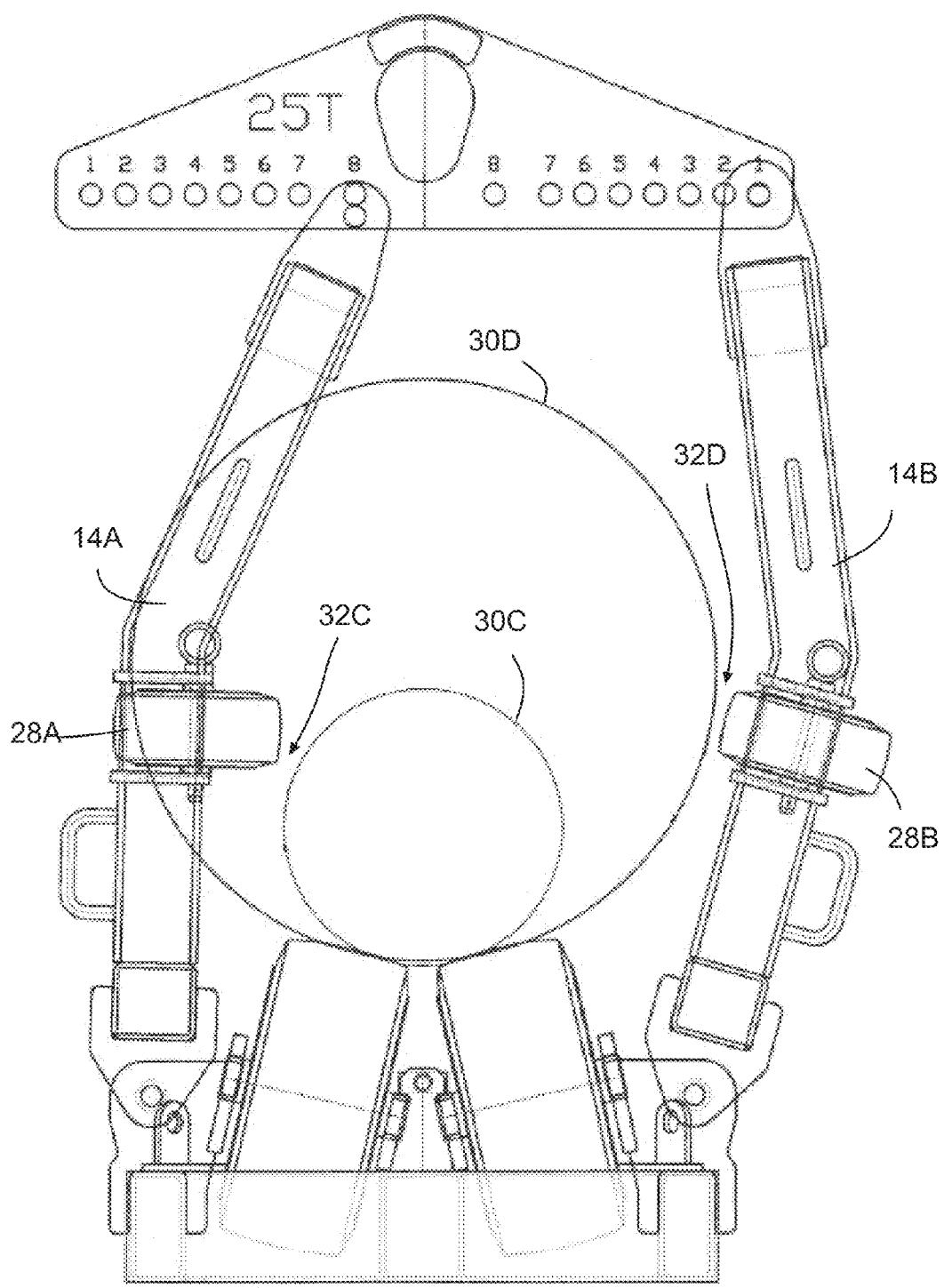
FIG. 4 shows an end view of the embodiment of FIG. 1 showing 20" and 42" pipes.

FIG. 4 shows different sized pipes 30C (of 20 inch diameter) and 30D (of 42 inch diameter). These are respectively the smallest and largest pipe sizes that the embodiment shown is designed to accommodate. Other embodiments may accommodate different sizes of pipe. In addition to the placement of the connection of the lifting arms to the spreader bar to accommodate the different pipe sizes, FIG. 4 also shows that the positions of the side wheels 28 are also adjusted. The side wheels 28A on left arm 14A are placed in an outer position to accommodate the smaller pipe 30C and the side wheels 28B on right arm 14B are placed in an inner position to accommodate the larger pipe 30D. In the context of the side wheels and mounting positions for the side wheels, "inner" means that the portion of the surface of the side wheel facing a (actual or hypothetical) centrally located pipe is in a position retracted inward towards the lifting arm and "outer" means that the portion of the surface of the side wheel facing a (actual or hypothetical) centrally located pipe is in a position extended outward from the lifting arm. Different combinations of the placement of the connection of the lifting arms to the spreader bar and the positioning of the side wheels 28A, 28B can be used to accommodate differently sized pipes, as shown in table 1. In FIG. 4, clearance 32C between the side wheels and pipe 30C is 1.6 inches, and clearance 32D between the side wheels and pipe 30D is 1.0 inches.

TABLE 1

| Pipeline Size | Spreader Bar Hole Number | Wheel Distance From Pipe [in] | | |
|---|---|---|---|---|
| | | Outer | Middle | Inner |
| 42" | 1 | | | 0.9" |
| 40" | 2 | | | 0.7" |
| 38" | 3 | | | 0.6" |
| 36" | 4 | | | 0.5" |
| 34" | 5 | | | 0.4" |
| 32" | 6 | | | 0.4" |
| 30" | 7 | | 1.0" | |
| 28" | 4 | | 1.2" | |
| 26" | 5 | | 1.3" | |
| 24" | 6 | | 1.5" | |
| 22" | 7 | | 1.8" | |
| 20" | 8 | | 1.6" | |

There are many combinations to get a requested distance from the pipe. Using a smaller spreader bar hole number (position on the spreader bar closer to the outside) you can get a larger distance from the pipe. You also get a larger distance by switching from an outer to middle position of the wheels on the lifting arm or from a middle to inner position of the wheels on the lifting arm.

Figure 5:
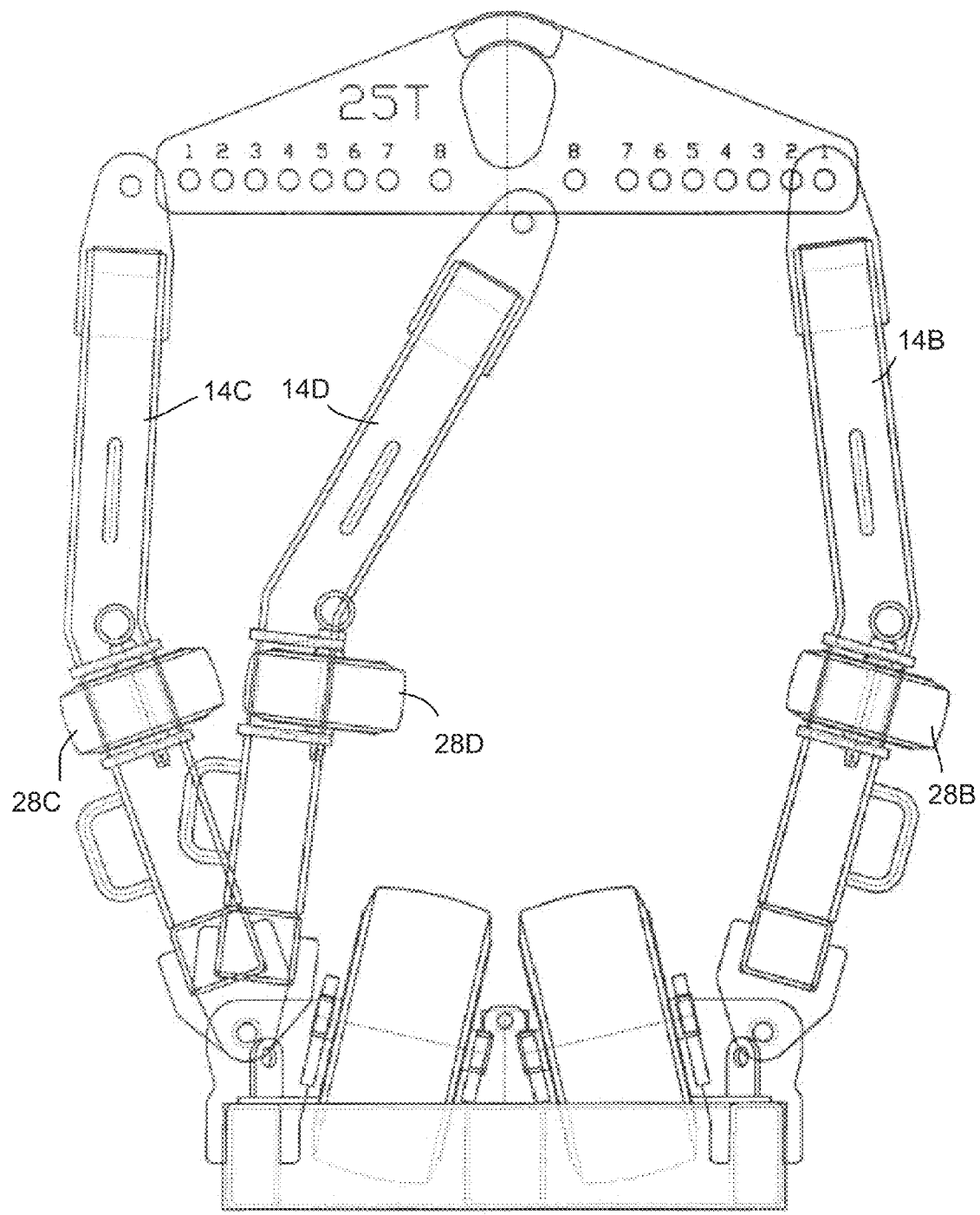
FIG. 5 shows an end view of the embodiment of FIG. 1 showing different wheel positions on the arms.

FIG. 5 shows different side wheel positions in more detail. In FIG. 5 the lifting arm on the left side of the figure is shown twice in different positions 14C and 14D in order to show different positions of the side wheels on the lifting arm. On the lifting arm 14C wheel 28C is positioned in a middle position and on lifting arm 14D wheel 28D is positioned in an outer position. On right lifting arm 14B wheel 28B is positioned in an inner position as in FIG. 4.

Figure 6A:
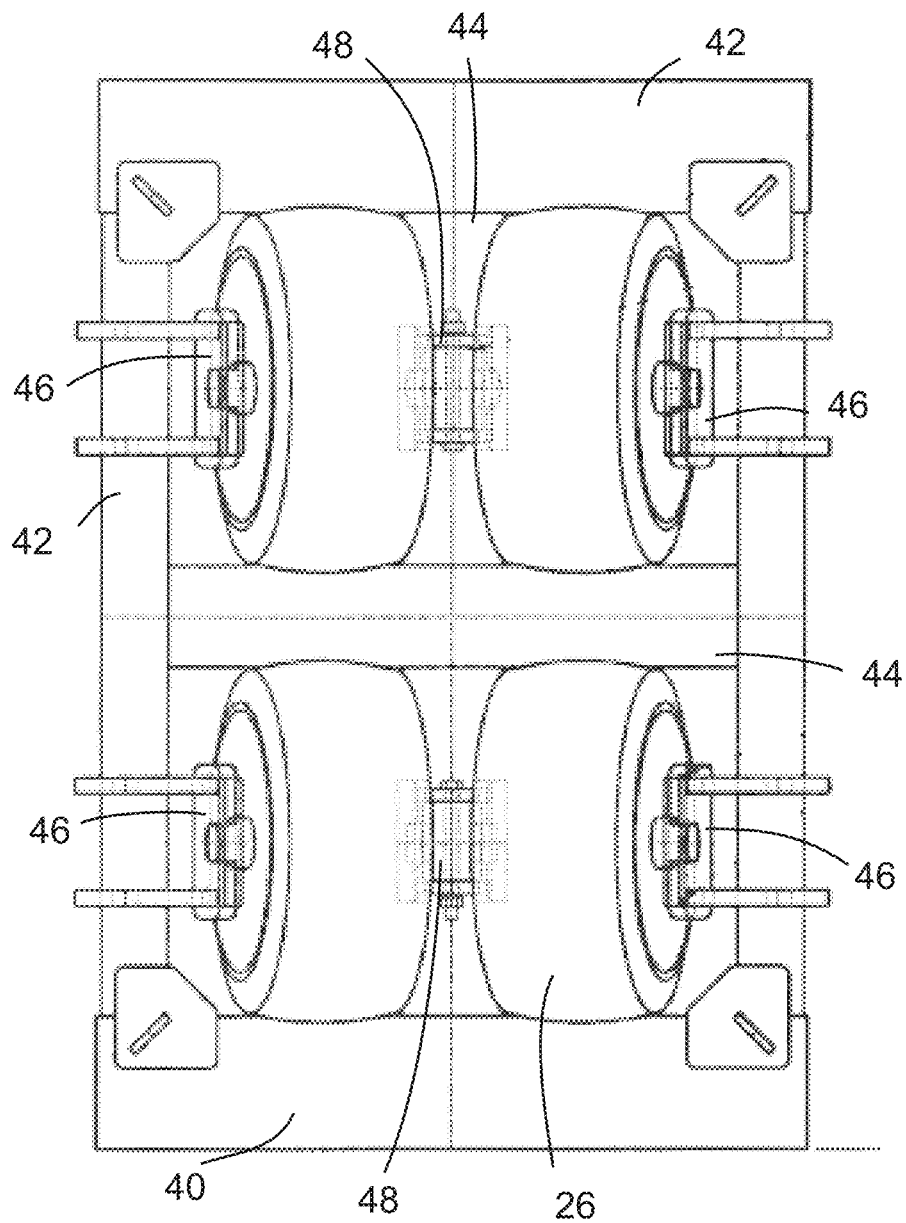
FIGS. 6A-6C show a top view, side view and end view respectively of a base of the embodiment of FIG. 1.
Figure 6B:
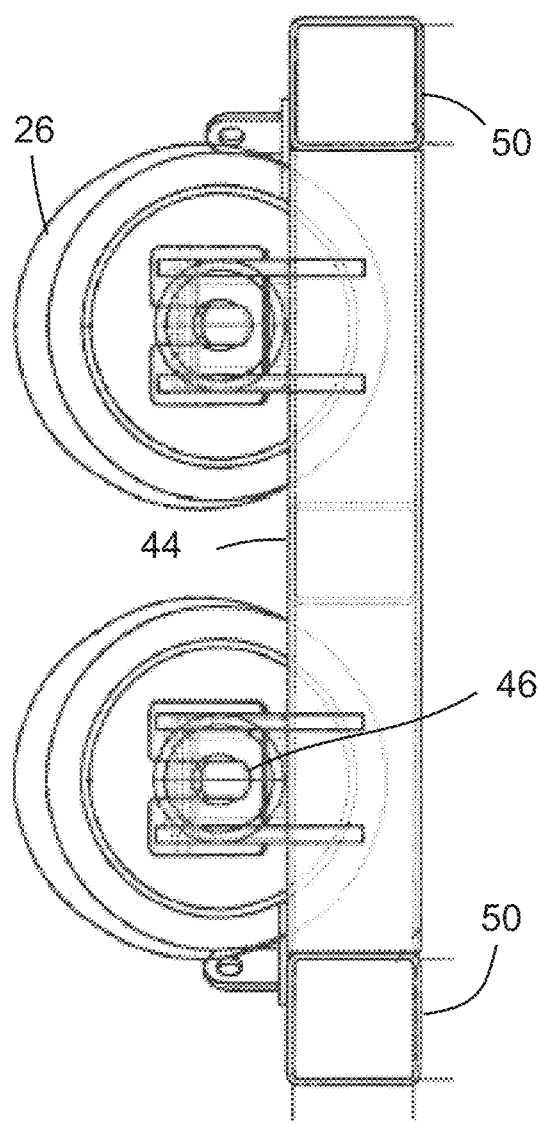
Figure 6C:
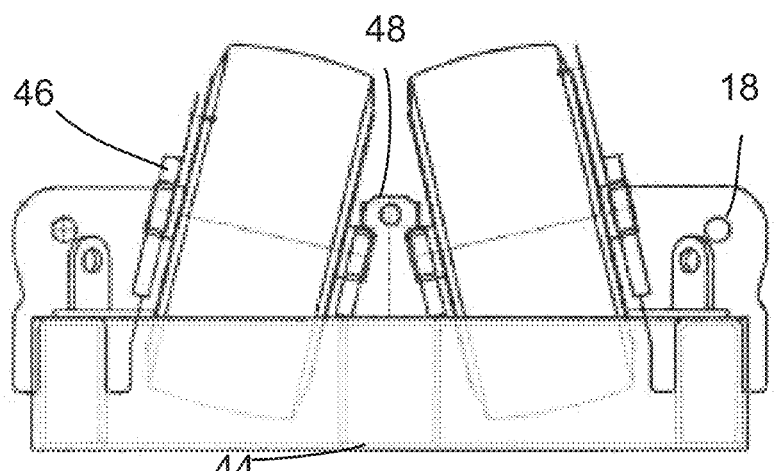

FIG. 6A shows a top view of a base for the embodiment of a pipeline cradle shown, FIG. 6B shows a side view, and FIG. 6C shows an end view. The base comprises a frame 40 here comprising a rectangular outer frame 42 and inner cross beams 44 dividing the frame into four quadrants. In each quadrant is located a base wheel 26. Each base wheel 26 is mounted between an outer wheel mounting portion 46 on the outer frame and an inner wheel mounting portion 48 on an inner cross beam. Here, the wheel mounting portions each comprise a saddle to accommodate a shaft of a wheel and a safety plate is attached over the saddle when the wheel is in position. For the inner wheel mounting portions, a single safety plate is attached over the saddles for wheels on both sides. The wheel mounting portions are positioned so that each wheel is tilted towards the center of the frame to better match the curve of a pipe supported by the wheels. Each base wheel is positioned so as not to contact the ground when the frame is on the ground. Hinged connections 18 to the lifting arms are in this embodiment located on outer wheel mounting portions, but could be located separately. Holes 50 through the length of end portions of the base frame accommodate forklift arms to facilitate lifting of the base with a forklift.

Figure 11A:
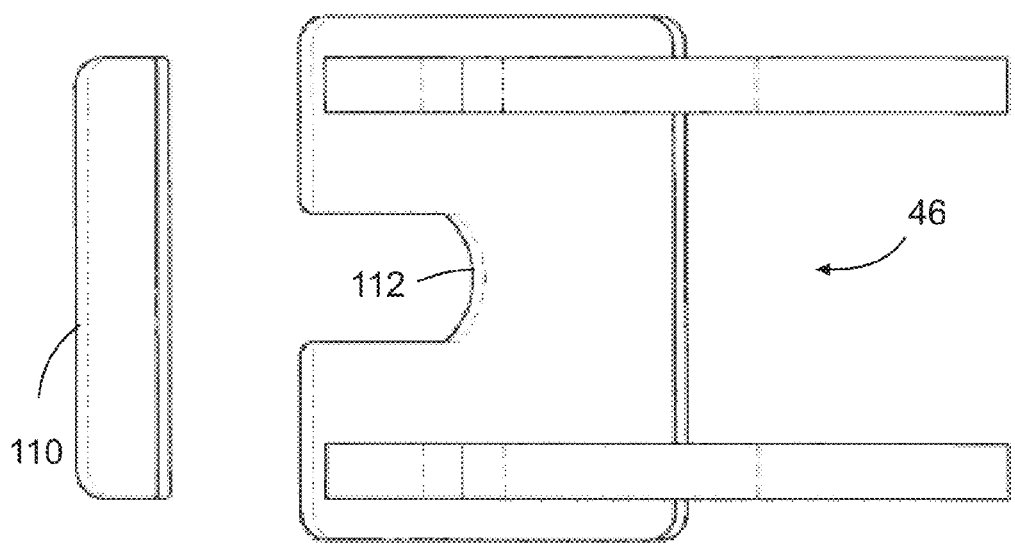
FIGS. 11A-11C show a side view, top view and end view respectively of an outer wheel mounting portion.
Figure 11B:
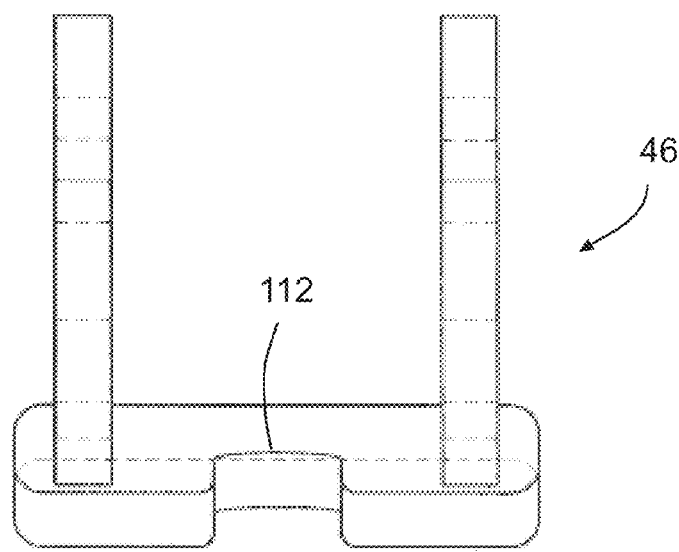
Figure 11B:
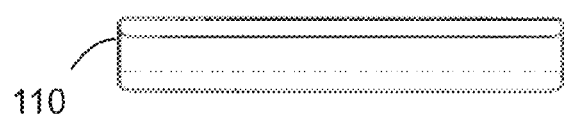
Figure 11C:
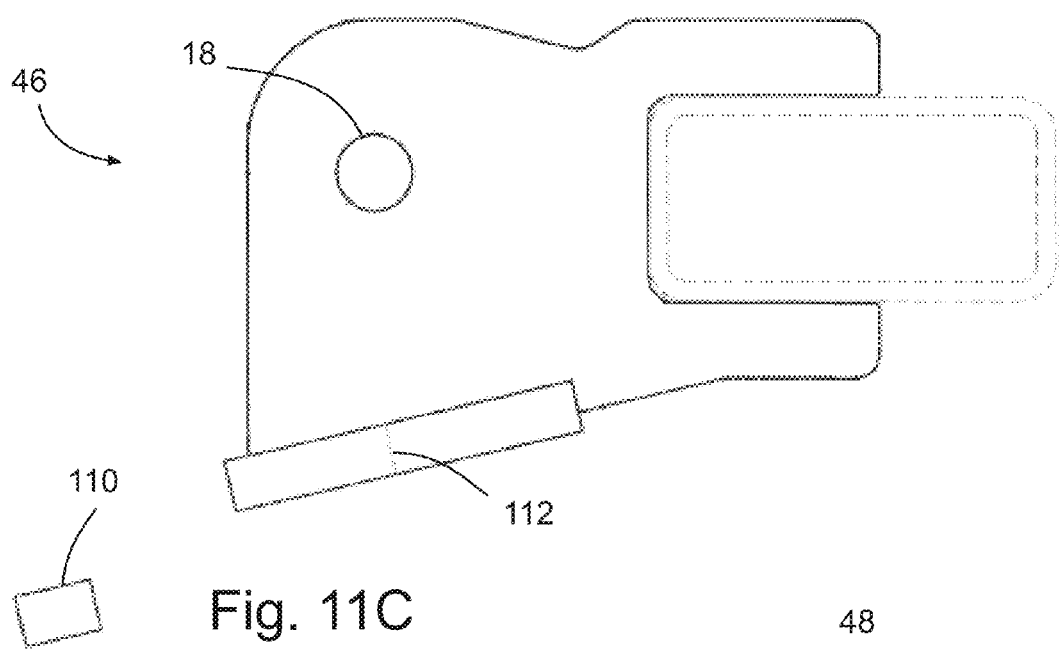

FIGS. 11A-11C show a side view, top view and end view respectively of an outer wheel mounting portion 46. Here, safety plate 110 is shown separate from saddle 112; it would be attached after the wheels are in place.

Figure 12A:
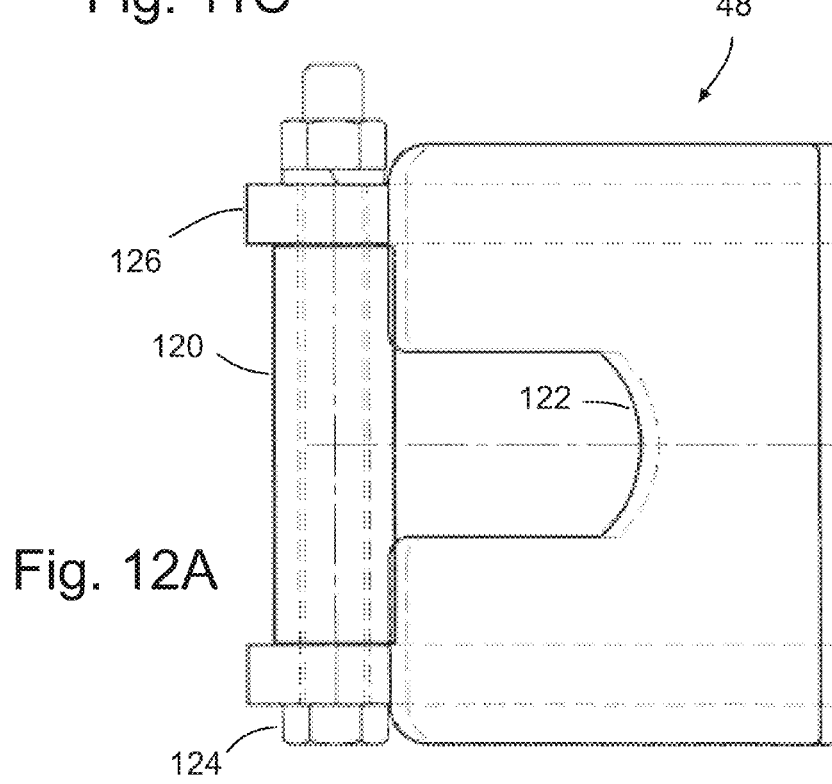
FIGS. 12A-12C show a side view, top view and end view respectively of an inner wheel mounting portion.
Figure 12B:
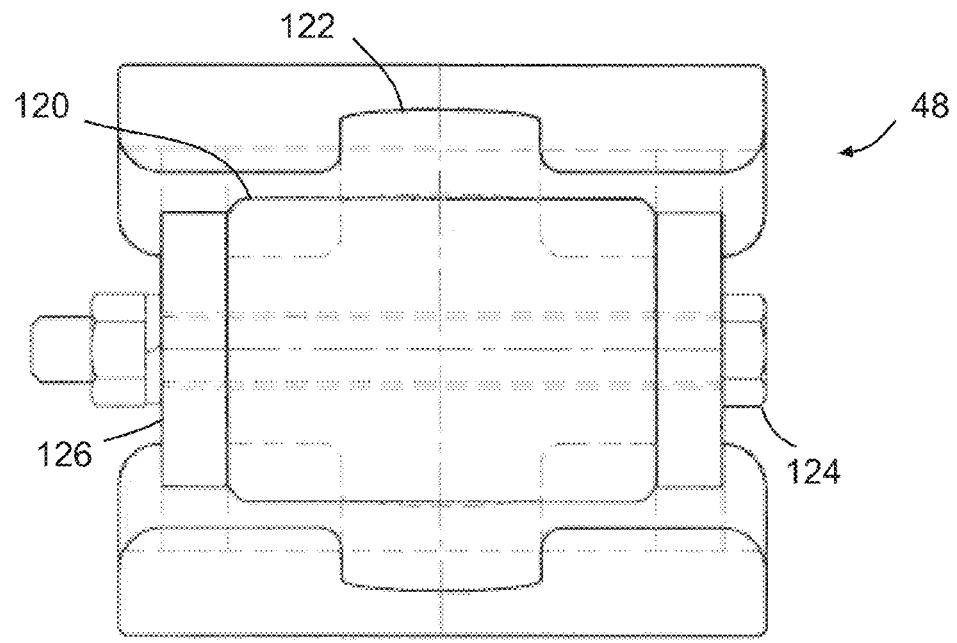
Figure 12C:
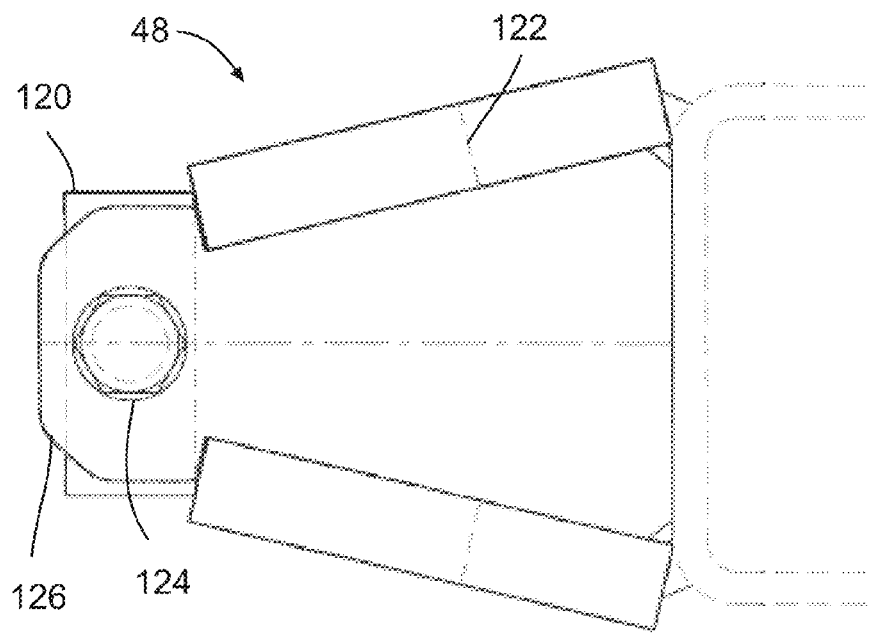

FIGS. 12A-12C show a side view, top view and end view respectively of an inner wheel mounting portion 48. Here, safety plate 120 is shown installed over saddles 122, held in place by hex bolt 124 extending between end portions 126.

Figure 7A:
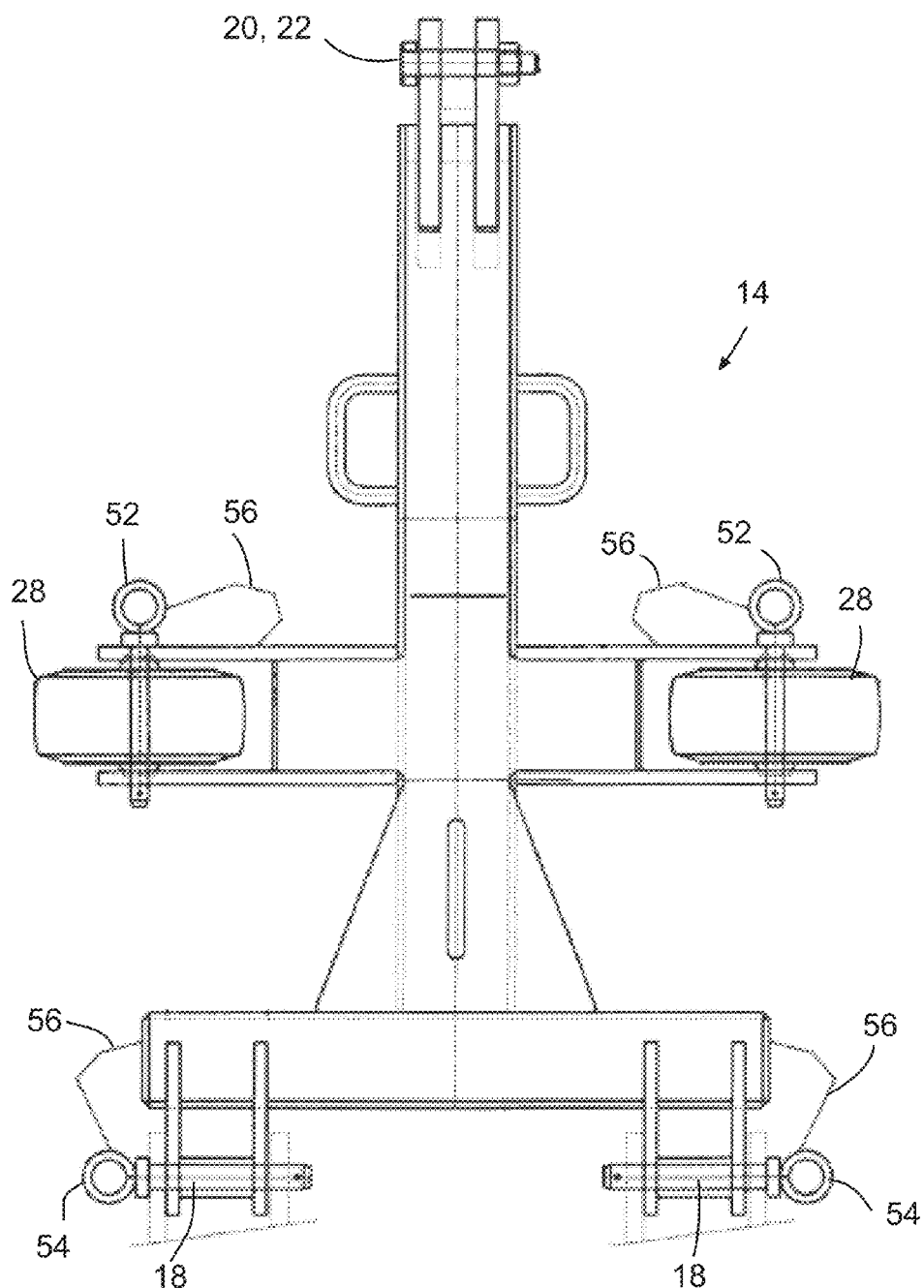

FIG. 7A shows a side view of a lifting arm 14, FIG. 7B shows an end view, and FIG. 7C shows a top view. "Side," "end" and "top" are here used to indicate directions relative to the pipeline lifting cradle as a whole. Side wheels 28 are in the embodiment shown attached to the lifting arm using pins 52 and hinged connections 18 with the base also use pins 54. Here, the pins are shown connected to the lifting arm using chains 56 to prevent the pins from getting separated the lifting arm when the pipeline lifting cradle is disassembled. The side wheels 28 are located on a crossbar 58 of the lifting arm 14. In order to adjust the positioning of the side wheels between outer, middle and inner positions, they can be connected to an outer hole 60A, middle hole 60B or inner hole 60C respectively in the crossbar 58. In FIG. 7C, the side wheel towards the top of the page is shown connected to outer hole 60A and the side wheel toward the bottom of the page is shown connected to inner hole 60C.

FIG. 8A shows an end view of a spreader bar 16, and FIG. 8B shows a side view. The terms "end" and "side" are used here relative to the pipeline lifting cradle as a whole. Spreader bar 16 defines a lifting hole 62 by which a crane or other lifting device can lift the spreader bar, and the rest of the pipeline cradle and pipeline when attached to the spreader bar. In the embodiment shown, plates 64 are welded to the spreader bar above the lifting hole mainly to prevent wear at the lifting point. Markings 66 are provided in black paint. In the embodiment shown, holes 24 each have a diameter of 1.5 inches, and are separated by 2.5 inches center-to-center, except that the hole marked "8" is separated 4 inches center-to-center from the hole marked "7." The hole marked 1 has a center located 2.5 inches from the side of the spreader bar. The spreader bar is 15.32 inches tall, 53 inches across and 1.75 inches thick except where the additional plates 64 are welded to increase the thickness to 2.5 inches. The lifting hole is 9.45 inches tall and has an upper portion with a diameter of 7 inches. The distance from the top of the spreader bar to the top of the lifting hole is 2.5 inches. There is a 0.25 inch gap between the edges of the additional plate and the edges of the spreader bar.

Figure 9:
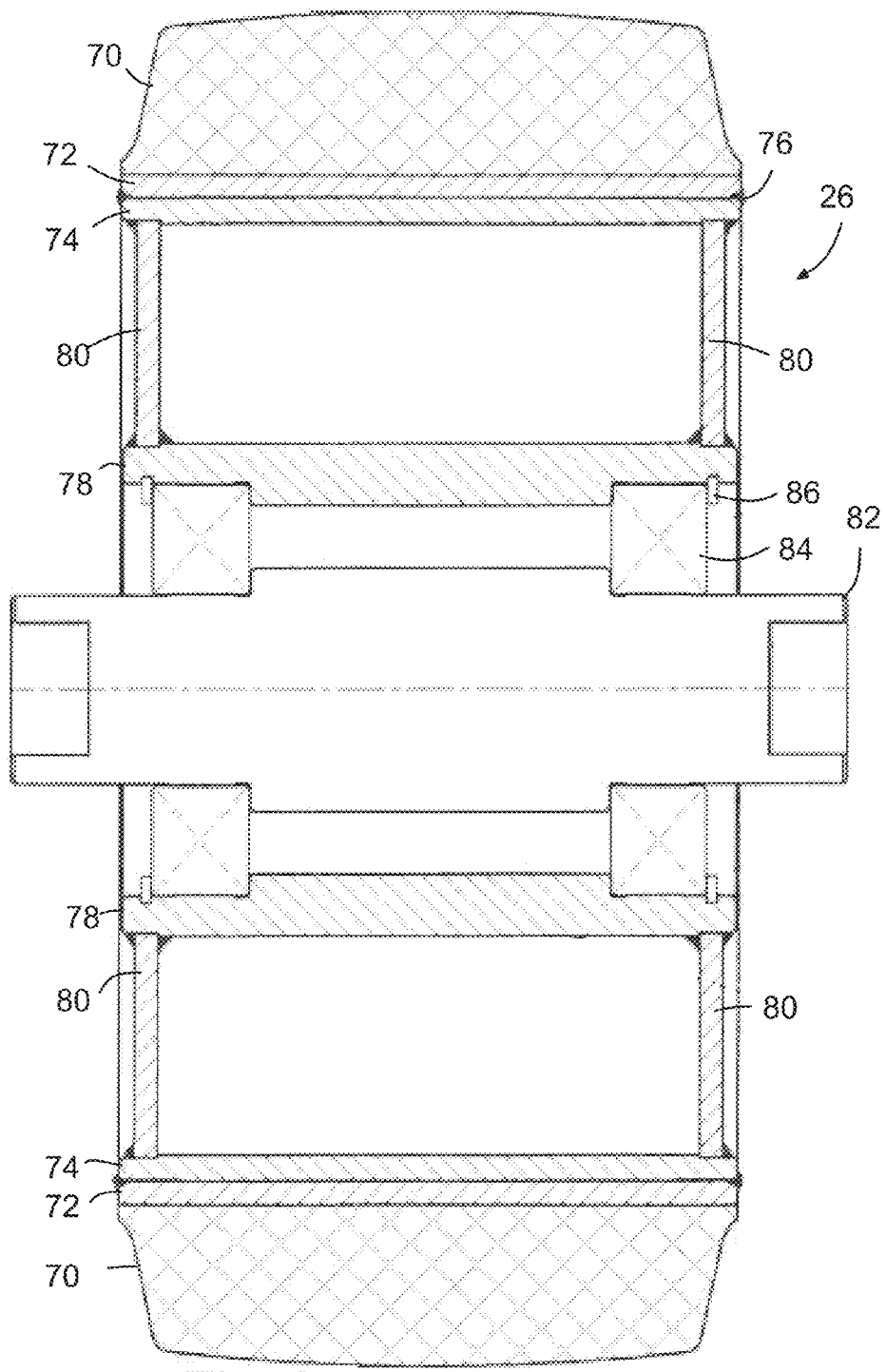
FIG. 9 shows a cutaway view of a base wheel of the embodiment of FIG. 1.

FIG. 9 shows a cross section view of a base wheel 26. In the embodiment shown press-on tires are used comprising a rubber portion 70 and inner portion 72. Inner portions 72 are pressed onto rim 74 and welded to the rim using spot welds 76. Rim 74 is connected to hub 78 using plates 80 welded to the rim and hub. Hub 78 is rotatably connected to shaft 82 via bearings 84. Bearings 84 are held in position with retaining rings 86.

Figure 10:
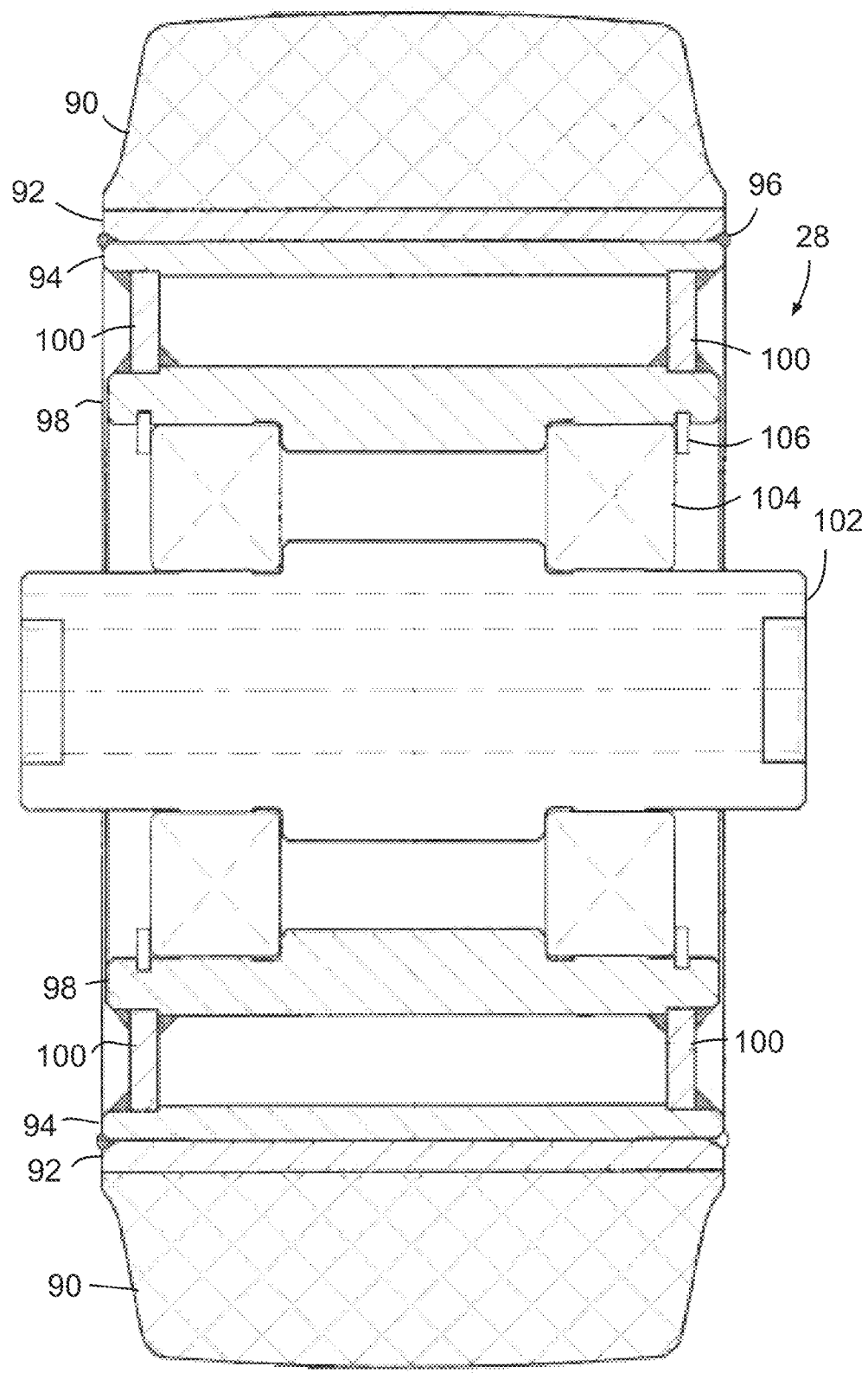
FIG. 10 shows a cutaway view of a side wheel of the embodiment of FIG. 1.

FIG. 10 shows a cross section view of a side wheel 28. In the embodiment shown press-on tires are used comprising a rubber portion 90 and inner portion 92. Inner portions 92 are pressed onto rim 94 and welded to the rim using spot welds 96. Rim 94 is connected to hub 98 using plates 100 welded to the rim and hub. Hub 98 is rotatably connected to shaft 102 via bearings 104. Bearings 104 are held in position with retaining rings 106. The tires may be solid treadless tires.

The embodiment of a pipeline lifting device shown in the figures is designed to work with 20 inch to 42 inch outer diameter (O.D.) pipelines. The working load limit is 50,000 lb (22,680 Kg). Min. working temperature is −29° C. (−20° F.). Lifting shock is not permitted. Static load capacity on the tire of the base wheels, here a treadless Solideal™ Magnum™ tire, is 6,900 Kg (15,200 lb). The lifting device should be operated as follows: according to pipeline size the side wheels should be adjusted (3 holes option) and lifting arms should be pinned on spreader bar holes to have a clearance of 1 inch or less between side wheels and pipeline. First, the base with 22 inch outer diameter wheels should be put under the pipeline. It should be centered and coaxial with the pipeline axis. Then, lifting tackle (spreader bar) with lifting arms attached should be lifted by crane or side boom tractor above the pipeline, arms open as necessary to go over the pipeline and then put down and pinned to the base frame. The lifting device should not be overloaded and the crane or side boom tractor used should have proper lifting capacity and enough stability to hold the lifting device during moving the pipeline. The lifting device should be inspected before the job and should not be used if damaged. All safety codes and regulations should be followed during the lifting and moving of the pipeline.

In the embodiment shown the total weight of the lifting device is 3,640 lb, the weight of the base is 2,180 lb, and the weight of the spreader bar with two lifting arms is 1460 lb.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A cradle for lifting a pipeline, comprising:
   a base;
   wheels mounted in the base, the wheels configured to support the pipeline when the base is positioned under the pipeline;
   a spreader bar configured to be positioned above the pipe; and
   rigid connector arms for connecting the spreader bar to the base to support the base, the rigid connector arms each having a pivotable connection for connecting to one of the spreader bar and the base and a connection with an adjustable position for connecting to the other of the spreader bar and the base.

2. The cradle of claim 1 in which the connection with an adjustable position is also pivotable.

3. The cradle of claim 1 further comprising side wheels mounted on the rigid connector arms to prevent contact of the rigid connector arms with the pipe.

4. The cradle of claim 3 in which the side wheels are mounted on the rigid connector arms with an adjustable position.

5. The cradle of claim 1 in which the one of the spreader bar and the base is the base and the other of the spreader bar and the base is the spreader bar.

6. The cradle of claim 1 in which the wheels are positioned within the base so that the wheels do not touch the ground when the base is placed on the ground.

7. The cradle of claim 1 in which the wheels mounted in the base have treadless tires constructed to distribute weight evenly across the tires.

8. The cradle of claim 1 in which the wheels mounted in the base have treadles s tires.

9. A cradle for lifting a pipeline, comprising:
   a base;
   wheels mounted in the base, the wheels configured to support the pipeline when the base is positioned under the pipeline, the wheels being positioned within the base so that the wheels do not touch the ground when the base is placed on the ground; and
   a spreader bar configured to be positioned above the pipe and to connect to the base to support the base.

10. A cradle for lifting a pipeline, comprising:
    a base;
    wheels mounted in the base, the wheels having treadless tires constructed to distribute weight evenly across the tires, the wheels configured to support the pipeline when the base is positioned under the pipeline;
    a lifting structure configured to attach to the base to support the base the lifting structure comprising: a spreader bar configured to be positioned above the pipe; and rigid connector arms for connecting the spreader bar to the base to support the base, the rigid connector arms each having a pivotable connection for connecting to one of the spreader bar and the base and a connection with an adjustable position for connecting to the other of the spreader bar and the base.

* * * * *

UNITED STATES PATENT AND TRADEMARK OFFICE
CERTIFICATE OF CORRECTION

PATENT NO. : 9,505,589 B1
APPLICATION NO. : 14/723190
DATED : November 29, 2016
INVENTOR(S) : B. Bogic Page 1 of 1

It is certified that error appears in the above-identified patent and that said Letters Patent is hereby corrected as shown below:

In the Claims

| Column | Line | Error |
|---|---|---|
| 6 (Claim 8, Line 2) | 38 | "treadles s" should read --treadless-- |

Signed and Sealed this
Eighteenth Day of April, 2017

Michelle K. Lee
*Director of the United States Patent and Trademark Office*